(12) United States Patent
Fukuhara et al.

(10) Patent No.: US 8,630,487 B2
(45) Date of Patent: Jan. 14, 2014

(54) IMAGE PROCESSING APPARATUS AND METHOD

(75) Inventors: Takahiro Fukuhara, Kanagawa (JP); Hitoshi Kiya, Tokyo (JP)

(73) Assignees: Sony Corporation, Tokyo (JP); Tokyo Metropolitan University, Tokyo (JP)

( * ) Notice: Subject to any disclaimer, the term of this patent is extended or adjusted under 35 U.S.C. 154(b) by 24 days.

(21) Appl. No.: 13/371,724

(22) Filed: Feb. 13, 2012

(65) Prior Publication Data

US 2012/0213434 A1  Aug. 23, 2012

(30) Foreign Application Priority Data

Feb. 18, 2011 (JP) .................................. 2011-032779

(51) Int. Cl.
*G06K 9/36* (2006.01)

(52) U.S. Cl.
USPC ....................................................... 382/166

(58) Field of Classification Search
None
See application file for complete search history.

(56) References Cited

U.S. PATENT DOCUMENTS

| 6,788,811 | B1 * | 9/2004 | Matsuura et al. | 382/166 |
| 6,999,629 | B1 * | 2/2006 | Lechat et al. | 382/240 |
| 8,126,053 | B2 * | 2/2012 | Song | 375/240.12 |
| 2005/0281473 | A1 * | 12/2005 | Kim et al. | 382/236 |
| 2006/0210156 | A1 * | 9/2006 | Lei et al. | 382/166 |
| 2012/0082391 | A1 * | 4/2012 | Fernandes | 382/233 |
| 2013/0108185 | A1 * | 5/2013 | Kenji | 382/250 |

FOREIGN PATENT DOCUMENTS

JP  4436733  1/2010

OTHER PUBLICATIONS

Xiong et al., A Comparative Study of DCT- and Wavelet-Based Image Coding, Aug. 1999, IEEE Transactions on Circuits and Systems for Video Technology, vol. 9, No. 5, pp. 692-695.*
Alshina et al. "Rotational Transform for Image and Video Compression," IEEE 2011, p. 3689-3692.*
Hao, P. and Shi, Q. "Comparative Study of Color Transforms for Image Coding and Derivation of Integer Reversible Color Transform," IEEE 2000, p. 224-227.*
Hiroki Ohbayashi et al., "Analytical Evaluation on the Energy Compaction Provided by Karhunen-Loeve Transform" With an English Translation, pp. 1-35, IEEE, Aug. 1999.

* cited by examiner

*Primary Examiner* — Vu Le
*Assistant Examiner* — Samah Beg
(74) *Attorney, Agent, or Firm* — Frommer Lawrence & Haug LLP; William S. Frommer

(57) ABSTRACT

There is provided an image processing apparatus including: a first color transform unit carrying out a color transform on a combination of color components with high correlation out of a plurality of color components included in image data; and a second color transform unit carrying out a color transform on a combination of color components aside from the combination of color components subjected to the color transform by the first color transform unit out of the plurality of color components included in the image data.

15 Claims, 16 Drawing Sheets

FIG.1

| R | G0 | R | G0 |
|---|----|---|----|
| G1 | B | G1 | B |
| R | G0 | R | G0 |
| G1 | B | G1 | B |

FIG. 10

| TEST IMAGE | RAW1 | RAW2 | RAW3 | RAW4 | RAW5 |
|---|---|---|---|---|---|
| NO TRANSFORM | 7.15 | 7.20 | 6.89 | 4.93 | 6.69 |
| CONVENTIONAL METHOD 1 (BIT SHIFT AND ADDITION/SUBTRACTION) | 6.33 | 6.70 | 6.93 | 4.59 | 6.02 |
| CONVENTIONAL METHOD 2 (4-POINT KLT) | 5.70 | 6.55 | 6.42 | 4.35 | 5.44 |
| HAAR + 3-POINT KLT | 5.70 | 6.55 | 6.37 | 4.36 | 5.44 |
| DPCM + 3-POINT KLT | 5.72 | 6.57 | 6.41 | 4.39 | 5.45 |
| S TRANSFORM + 3-POINT KLT | 5.69 | 6.56 | 6.39 | 4.35 | 5.44 |

FIG.16

| B | G |
|---|---|
| W | R |

A

| R | G |
|---|---|
| W | B |

B

| B | W | R | W |
|---|---|---|---|
| W | G | W | G |
| R | W | B | W |
| W | G | W | G |

C

| R | W | G | W |
|---|---|---|---|
| W | W | W | W |
| G | W | B | W |
| W | W | W | W |

D

| R | W | G | W | B | W |
|---|---|---|---|---|---|
| W | B | W | R | W | G |

E

| R | W | G | W | B | W |
|---|---|---|---|---|---|
| W | W | W | W | W | W |
| W | B | W | R | W | G |
| W | W | W | W | W | W |

F

| R | Ye |
|---|----|
| G | B  |

G

| R  | G |
|----|---|
| Ye | B |

H

| G  | Ye |
|----|----|
| Ye | B  |

J

IMAGE PROCESSING APPARATUS AND METHOD

BACKGROUND

The present disclosure relates to an image processing apparatus and method and in particular relates to an image processing apparatus and method that are capable of suppressing an increase in the processing load while realizing a significant reduction in data size.

In recent years, it has become increasingly common for digital still cameras and the like to include, as a mode for storing image data, a RAW compression mode in addition to a JPEG encoding mode where image data is encoded according to JPEG (Joint Photographic Experts Group) standard.

When JPEG encoding mode is used, developing processing, such as demosiacing, is carried out on pixels of the color components read from an image pickup element, pixel interpolation is also performed, and then the data is encoded according to JPEG standard. Since JPEG is an irreversible encoding method, when this mode is used, the original image information is lost.

Conversely, when a RAW compression mode is used, the data size is reduced by carrying out image processing on the pixels of the color components read from an image pickup element. Accordingly, in many cases this mode uses reversible compression. Also, since intermediate processing such as demosaicing and pixel interpolation is unnecessary, there is little computational load and because interpolation is yet to be carried out, it is possible to carry out processing on an image that still has a low resolution (i.e., small size).

It is therefore possible to maintain the image quality of the image pickup element. For this reason, RAW compression is becoming increasingly necessary as a format capable of compression and storage with no loss in the pixels of the color components.

As one example of a RAW image compression method, a method that carries out a specified color transform on the four color components (R, G0, G1, B) of a Bayer pattern to transform such components to the four components Y, Cb, Cr, and Cg has been proposed (see for example, Japanese Patent No. 4,436,733).

A method that uses a Karhunen-Loeve Transform (hereinafter "KLT") for such a color transform process has also been proposed (see, for example, "Analytical Evaluation on the Energy Compaction Provided by Karhunen-Loeve Transform" by Ohbayashi Hiroki, Bandoh Yukihiro, Takamura Seishi, Jozawa Hirohisa, and Yashima Yoshiyuki in "1E10E Transactions on Fundamentals" submitted on Vol. J93-A No. 9 pp. 636-637, 2009.12.7 and resubmitted on 2010.5.10).

SUMMARY

However, with the method disclosed in Japanese Patent No. 4,436,733, there has been a risk that the reduction in data size will be small compared to the method disclosed in the "Analytical Evaluation on the Energy Compaction Provided by Karhunen-Loeve Transform" article. Conversely, with the method disclosed in the article, there is the risk of an increase in processing compared to the method disclosed in Japanese Patent No. 4,436,733.

Since such conventional color transform methods have the stated drawbacks, there is demand for a novel and improved RAW image compression method.

The present disclosure aims to provide an apparatus and method that are capable of suppressing an increase in the processing load while realizing a significant reduction in data size.

According to an embodiment of the present disclosure, there is provided an image processing apparatus including a first color transform unit carrying out a color transform on a combination of color components with high correlation out of a plurality of color components included in image data, and a second color transform unit carrying out a color transform on a combination of color components aside from the combination of color components subjected to the color transform by the first color transform unit out of the plurality of color components included in the image data.

The second color transform unit may carry out a Karhunen-Loeve transform.

The first color transform unit may carry out a Haar transform.

The first color transform unit may carry out a color transform using DPCM (Differential Pulse Code Modulation).

The first color transform unit may carry out an S transform.

The image processing apparatus may further include a frequency conversion unit carrying out frequency conversion on some or all of the color components after the color transforms by the first color transform unit and the second color transform unit.

The image processing apparatus may further include a control unit controlling whether to subject the respective color components after the color transforms by the first color transform unit and the second color transform unit to the frequency conversion. The frequency conversion unit may carry out the frequency conversion on color components judged by the control unit to be subjected to the frequency conversion.

The control unit may include a measuring unit measuring energy of each color component aft the color transforms by the first color transform unit and the second color transform unit, a judging unit comparing the energy of each color component measured by the measuring unit with a specified threshold and judging whether to subject each color component to the frequency conversion in accordance with a comparison result, and a selection unit selecting processing to be carried out on each color component in accordance with a judgment result of the judging unit.

The frequency conversion unit may carry out frequency conversion of specified color components after the color transforms by the first color transform unit and the second color transform unit.

The image processing apparatus may further include an encoding unit encoding (i) frequency conversion coefficients of color components obtained by the frequency conversion by the frequency conversion unit after the color transforms by the first color transform unit and the second color transform unit, and/or (ii) color components after the color transforms by the first color transform unit and the second color transform unit The frequency conversion unit may carry out a DCT (Discrete Cosine Transform) on the color components.

The frequency conversion unit may subject the color components to a wavelet transformation.

The imaged data may be information on an image in which the color components are arranged in a Bayer pattern.

According to another embodiment of the present disclosure, there is provided an image processing method of an image processing apparatus including having a first color transform unit carry out a color transform on a combination of color components with high correlation out of a plurality of color components included in image data, and having a second color transform unit carry out a color transform on a combination of color components aside from the combination of color components subjected to the color transform by the first color transform unit out of the plurality of color components included in the image data.

According to another embodiment of the present disclosure, there is provided an image processing apparatus including a color transform unit carrying out a color transform on a plurality of color components included in image data, a frequency conversion unit carrying out frequency conversion on some or all of the color components after the color transform by the color transform unit, and an encoding unit encoding color components after the color transform by the color transform unit.

According to another embodiment of the present disclosure, there is provided an image processing method of an image processing apparatus including having a color transform unit carry out a color transform on a plurality of color components included in image data, having a frequency conversion unit carry out frequency conversion on some or all of the color components after the color transform, and having an encoding unit encode color components after the color transform.

According to an embodiment of the present disclosure, a color transform on a combination of color components with high correlation out of a plurality of color components included in image data is carried out, and a color transform on a combination of color components aside from the combination of color components subjected to the color transform by the first color transform unit out of the plurality of color components included in the image data is carried out.

According to another embodiment of the present disclosure, a color transform on a plurality of color components included in image data is carried out, frequency conversion on some or all of the color components after the color transform is carried out, and color components after the color transform is encoded.

According to the present disclosure, it is possible to process images. In particular, it is possible to suppress an increase in processing load while realizing a significant reduction in data size.

BRIEF DESCRIPTION OF THE DRAWINGS

FIG. 1 is a diagram showing one example of a Bayer pattern;

FIG. 10 is a diagram useful in explaining entropy values after a color transform according to various methods;

FIG. 16 is a diagram showing yet another example of a Bayer pattern; and

DETAILED DESCRIPTION OF THE EMBODIMENT(S)

Figure 2:
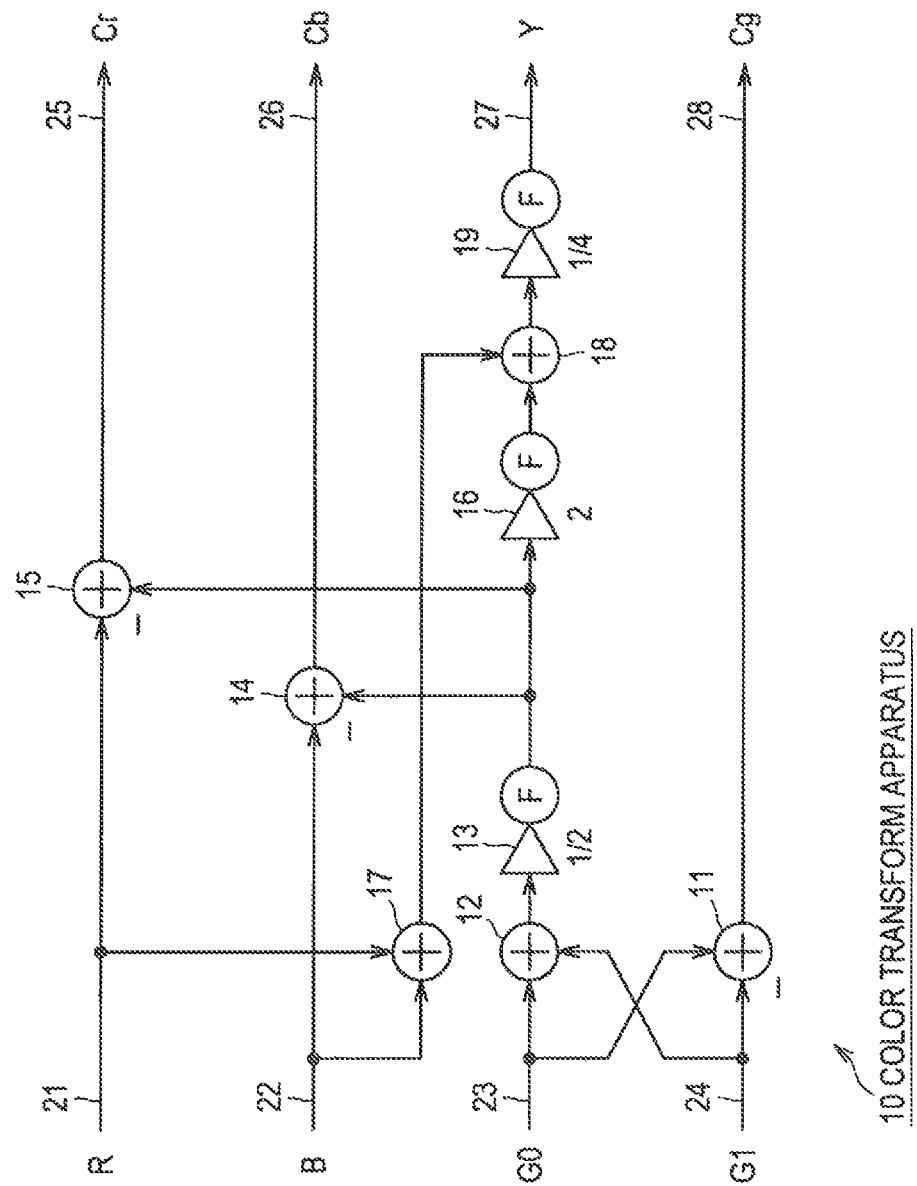
FIG. 2 is a diagram showing one example of the principal configuration of a conventional color transform apparatus.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order given below.
1. First Embodiment (Color Transform Apparatus)
2. Second Embodiment (Image Encoding Apparatus)
3. Third Embodiment (Personal Computer)

1. First Embodiment

Color Components

Figure 1:
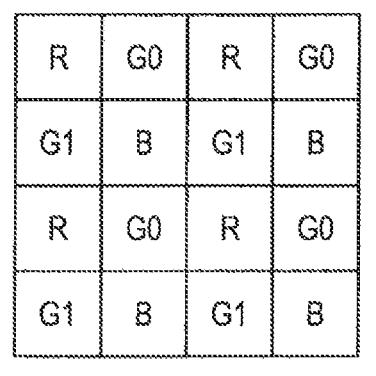

With RAW compression carried out in a digital camera or the like, data for each color component is acquired from an image pickup element or the like and then processed. A RAW image acquired from an image pickup element has a Bayer pattern structure such as that shown in FIG. 1, for example. That is, the RAW image includes red (R), blue (B), and green (G0, G1) color components.

Color Transform Apparatus 1

FIG. 2 is a block diagram showing an example of the principal configuration of a color transform apparatus 1 that carries out a color transform process on this type of RAW image.

The color transform apparatus 10 shown in FIG. 2 is an apparatus that carries out a color transform process according to the color transform method disclosed in Japanese Patent No. 4,436,733. The color transform apparatus 10 reduces the data size by converting the R, B, G0, and G1 of a RAW image to Y, Cr, Cb, and Cg.

As shown in FIG. 2, the color transform apparatus 10 includes a subtractor 11, an adder 12, a right one-bit shift unit 13, a subtractor 14, a subtractor 15, a left one-bit shift unit 16, an adder 17, an adder 18, and a right two-bit shift unit 19. R, B, G0, and G1 are respectively inputted into input 21 to input 24. Cr, Cb, Y, and Cg are respectively outputted from output 25 to output 28.

The subtractor 11 subtracts the input 23 from the input 24 (G0-G1), and the subtraction result is outputted from the output 28 (Cg).

The adder 12 adds the input 23 and the input 24 (G0+G1). The right one-bit shift unit 13 divides such addition result by two (i.e., shifts the result to the right by one bit (F[G0+G1]/2)).

The subtractor 14 subtracts the output of the right one-bit shift unit 13 from the input 22 (B−F[G0−G1]/2]) and outputs the subtraction result from the output 26 (Cb).

The subtractor 15 subtracts the output of the right one-bit shift unit 13 from the input 21 (R−F[(G0+G1)/2]) and outputs the subtraction result from the output 25 (Cr).

The left one-bit shift unit 16 multiplies the output of the right one-bit shift unit 13 by two (i.e., shifts the result to the left by one bit (2*F[G0+G1]/2)).

The adder 17 adds the input 21 and the input 22 (R+B). The adder 18 adds the output of the left one-bit shift unit 16 and the addition result of the adder 17 (R+2*F[G0+G1/2]+B). The right two-bit shift unit 19 divides such addition result by four (i.e., shifts the result by two bits to the right (F[R+2×F[(G0+G1)/2]+B)/4])) and outputs from the output 27(Y).

That is, the color transform apparatus 10 carries out the color transform process shown in Equation (1) below.

Equation (1)

$$\begin{bmatrix} Y \\ Cr \\ Cb \\ Cg \end{bmatrix} = \begin{bmatrix} F[(R+2\times F[(G0+G1)/2]+B)/4] \\ R - F[(G0+G1)/2] \\ B - F[(G0+G1)/2] \\ G0 - G1 \end{bmatrix} \quad (1)$$

Color Transform Apparatus 2

Figure 3:
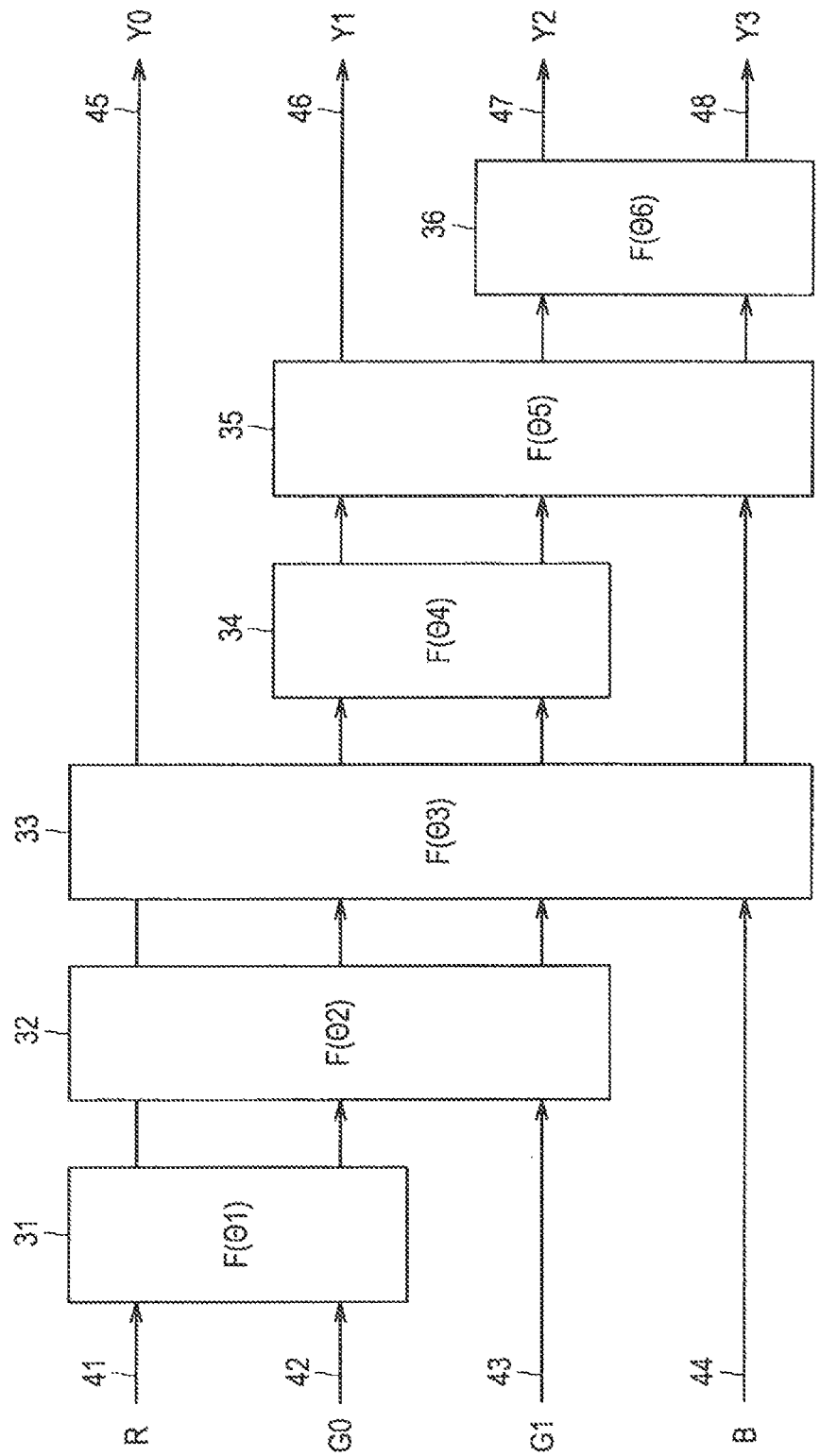
FIG. 3 is a diagram showing another example of the configuration of a conventional color transform apparatus.

FIG. 3 is a block diagram showing another example configuration of a color transform apparatus.

The color transform apparatus 30 shown in FIG. 3 is an apparatus for carrying out a color transform process using the color transform method (KLT) disclosed in the "Analytical Evaluation on the Energy Compaction Provided by Karhunen-Loeve Transform" article mentioned earlier. The information processing apparatus 30 reduces the data size by converting to R, B, G0, and G1 of a RAW image to Y0, Y1, Y2, and Y3.

As shown in FIG. 3, the color transform apparatus 30 includes a rotational transform unit 31 (F(Θ1)), a rotational transform unit 32 (F(Θ2)), a rotational transform unit 33 (F(Θ3)), a rotational transform unit 34 (F(Θ4)), a rotational transform unit 35 (F(Θ5)), and a rotational transform unit 36 (F(Θ6)).

R, G0, G1, and B are respectively inputted into input 41 to input 44. Y0, Y1, Y2, and Y3 are respectively outputted from output 45 to output 48.

The rotational transform unit 31 (F(Θ1)) carries out a rotational transform on the input 41 (R) and the input 42 (G0). The rotational transform unit 32 (F(Θ2)) carries out a rotational transform on the two outputs of the rotational transform unit 31 (F(Θ1)) and the input 43 (G1). The rotational transform unit 33 (F(Θ3)) carries out a rotational transform on the three outputs of the rotational transform unit 32 (F(Θ2)) and the input 44 (B).

One output of the rotational transform unit 33 (F(Θ3)) is outputted from the output 45 (Y0). The rotational transform unit 34 (F(Θ4)) carries out a rotational transform on the two outputs of the rotational transform unit 33 (F(Θ3)). The rotational transform unit 35 (F(Θ5)) carries out a rotational transform on the two outputs of the rotational transform unit 34 (F(Θ4)) and one output of the rotational transform unit 33 (F(Θ3)). The single output of the rotational transform unit 35 (F(Θ5)) is outputted from the output 46 (Y1).

The rotational transform unit 36 (F(Θ6)) carries out a rotational transform on the two outputs of the rotational transform unit 35 (F(Θ5)). The two outputs of the rotational transform unit 36 (F(Θ6)) are respectively outputted from the output 47 (Y2) and the output (Y3).

In this way, by carrying out a KLT with a lifting scheme (ladder structure), since rounding errors generated in the calculation process are cancelled out between the forward transform and the reverse transform, by rectifying an internal signals, it is possible to carry out a reversible transform. Accordingly, by using the KLT in FIG. 3, it is possible to realize reversible compression.

As shown in FIG. 3, when carrying out a reversible KLT on the four color components red (input 131), green-0 (input 132), green-1 (input 133), and blue (input 134), the six rotational transforms F(Θ1) to F(Θ6) are necessary. This is because when a four-input KLT is resolved into factors, six rotational transforms are required as elements.

The rotational transforms F(Θi) described above are expressed by Equation (2) to Equation (9) below.

Equation (2)

$$F(\theta i) = G(\phi) \cdot Q1 \quad (2)$$

Equation (3)

$$Q1 \in \{I, SP, SPSP, PS\} \quad (3)$$

Equation (4)

$$G(\phi) = \begin{bmatrix} \cos\phi & -\sin\phi \\ \sin\phi & \cos\phi \end{bmatrix} = \begin{bmatrix} 1 & 0 \\ f3 & 1 \end{bmatrix} \begin{bmatrix} 1 & f2 \\ 0 & 1 \end{bmatrix} \begin{bmatrix} 1 & 0 \\ f1 & 1 \end{bmatrix} \quad (4)$$

Equation (5)

$$I = \begin{bmatrix} 1 & 0 \\ 0 & 1 \end{bmatrix} \quad (5)$$

Equation (6)

$$P = \begin{bmatrix} 0 & 1 \\ 1 & 0 \end{bmatrix} \quad (6)$$

Equation (7)

$$S = \begin{bmatrix} -1 & 0 \\ 0 & 1 \end{bmatrix} \quad (7)$$

Equation (8)

$$f1 = f3 = \tan(\theta i/2) \quad (8)$$

Equation (9)

$$f2 = -\sin(\theta i) \quad (9)$$

For a black and white image, it is effective to carry out compression via a DCT since the signal quality approximates to high precision. On the other hand, for a color image, if a DCT is used after a color transform from RGB to YUV, since the autocorrelation and cross-correlation of the color components will greatly differ depending on the input image, favorable results will not necessarily be obtained. However, by using the KLT of the color transform apparatus 30 in place of the color transform of the color transform apparatus 10, decorrelation that is suited to the characteristics of different input images becomes possible and as a result effective compression can be realized.

However, since a KLT is composed of the rotational transforms described above and the individual rotational transforms involve calculation of a trigonometric function, there is typically a large computational load. Accordingly, compared to the simple color transform (composed of only addition, subtraction, and bit shift operations) of the color transform apparatus 10 in FIG. 2 or the like, the color transform of the color transform apparatus 30 has a large computational load.

Color Transform Apparatus 3

However, it is known that out of the color components of a RAW image, the correlation of the two green components (G0 and G1) is substantially constant and does not depend on the input image. This characteristic is therefore used and a transform with a much lighter load, for example a Haar transform, than a KLT is carried out on the two green components described above.

Figure 4:
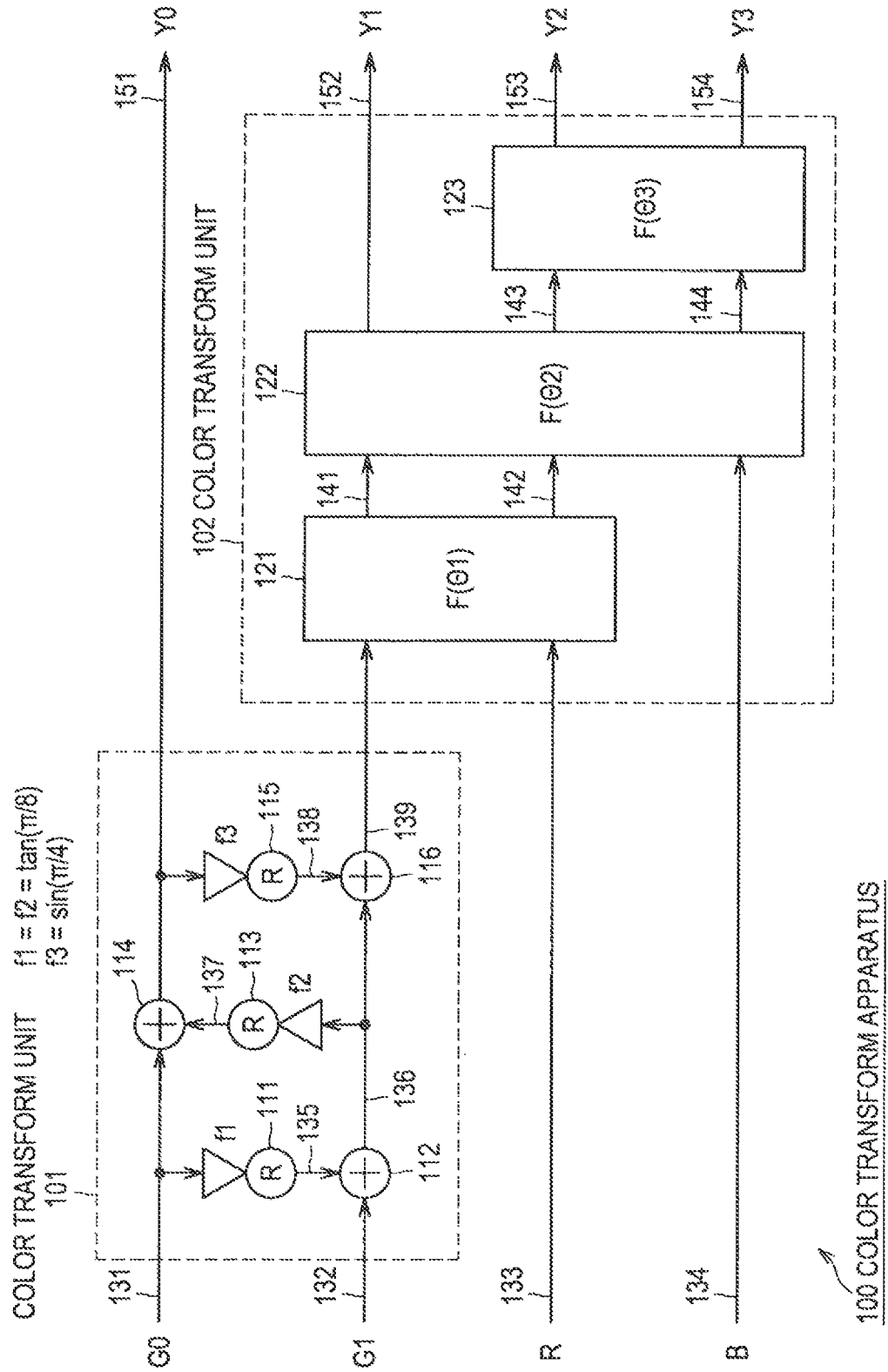
FIG. 4 is a diagram showing an example of the principal configuration of a color transform apparatus according to the present disclosure.

FIG. 4 is a block diagram showing yet another example configuration of a color transform apparatus.

The color transform apparatus 100 shown in FIG. 4 is fundamentally the same as the color transform apparatus 30 in FIG. 3, and reduces the data size by transforming R, B, G0, and G1 of a RAW image to Y0, Y1, Y2, and Y3.

As shown in FIG. 4, the color transform apparatus 100 includes a color transform unit 101 and a color transform unit 102. The color transform unit 101 carries out a Haar transform on a combination of the color components (a color component group composed of a plurality of color components) that have high correlation with one another out of the inputted color components.

G0, G1, R, and B are inputted into input 131 to input 134, respectively. Y0, Y1, Y2, and Y3 are outputted from output 151 to output 154, respectively.

The color transform unit 101 includes a rounding processing unit 111, an adder 112, a rounding processing unit 113, an adder 114, a rounding processing unit 115, and an adder 116.

The adder 112 adds a rounding processing result 135 for an input 131 (G0) produced by the rounding processing unit 111 and the input 132 (G1) to obtain an addition result 136. The adder 114 adds a rounding processing result 137 for the addition result 136 produced by the rounding processing unit 113 and the input 131 (G0) to obtain an output of the color transform, unit 101. This output is outputted to the periphery of the color, transform apparatus 100 from the output 151 (Y0).

The adder 116 adds a rounding processing result of the output of the adder 114 produced by the rounding processing unit 115 and the addition result 136 and outputs the addition result 139 as the output of the color transform unit 101. This output is supplied to the color transform unit 102.

That is, the color transform unit 101 carries out a Haar transform on G0 and G1 that have high correlation, one output (Y0) is outputted to the periphery of the color transform apparatus 100 from the output 151, and the other output is supplied to the color transform unit 102.

Equation (10) below shows a formula representing the color transform unit 101.

Equation (10)

$$\begin{bmatrix} Y0 \\ Y1 \end{bmatrix} = \begin{bmatrix} 2^{-1/2} & -2^{-1/2} \\ 2^{-1/2} & 2^{-1/2} \end{bmatrix} \begin{bmatrix} G0 \\ G1 \end{bmatrix} \quad (10)$$

The color transform unit 102 carries out a KLT on a different combination (color component group) of the inputted color components.

The color transform unit 102 includes a rotational transform unit 121 (F($\Theta 1$)), a rotational transform unit 122 (F($\Theta 2$)), and a rotational transform unit 123 (F($\Theta 3$)).

The rotational transform unit 121 (F($\Theta 1$)) carries out a rotational transform on one output of the color transform unit 101 and the input 133(R). The rotational transform unit 122 (F($\Theta 2$)) carries out a rotational transform on the output 141 and the output 142 of the rotational transform unit 121 (F($\Theta 1$)) and also the input 134(B). One output of the rotational transform unit 122 (F($\Theta 2$)) is outputted from the output 152 (Y1).

The rotational transform unit 123 (F($\Theta 3$)) carries out a rotational transform on the output 143 and the output 144 of the rotational transform unit 122 (F($\Theta 2$)). One of such outputs is outputted from the output 153 (Y2) and the other is outputted from the output 154 (Y3).

Although six rotational transforms are required for a four-input KLT as in the color transform apparatus 30, for a three-input KLT as in the color transform apparatus 100, three rotational transforms are sufficient.

As shown in Equation (10), a Haar transform can be realized by just addition, subtraction, and bit shift operations. Accordingly, compared to a KLT that involves rotational transforms, the processing load of a Haar transform is much smaller.

For the above reason, the color transform apparatus 100 is capable of lowering the load of the color transform process compared to when the color transform apparatus 30 carries out a four-input KLT.

Flow of Color Transform Process

Figure 5:
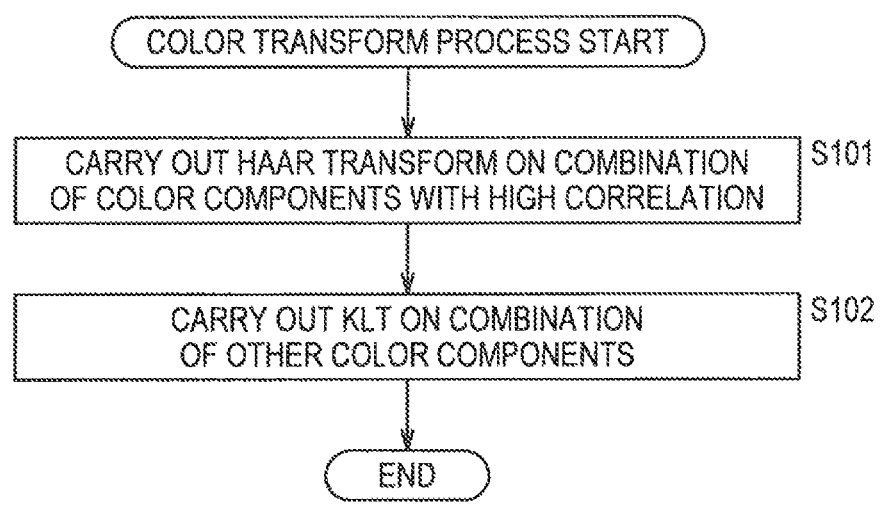
FIG. 5 is a flowchart useful in explaining one example of the flow of a color transform process.

Next, one example of the flow of the color transform process carried out by the color transform apparatus 100 in FIG. 4 will be described with reference to the flowchart in FIG. 5.

Once the color transform process starts, in step S101 the color transform unit 101 of the color transform apparatus 100 carries out a Haar transform on a combination of color components that have high correlation.

In step S102, the color transform unit 102 carries out a KLT on a combination of the other color components using the processing result of step S101.

After the processing in step S102 has ended, the color transform apparatus 100 ends the color transform process.

By carrying out such color transform process, the color transform apparatus 100 is capable of reducing the load of the color transform process compared to when the color transform apparatus 30 is used.

Color Transform Apparatus 4

Note that as the color transform process on a combination of color components that have high correlation with one another, it is possible to use DPCM (Differential Pulse Code Modulation) in place of the Haar transform.

Figure 6:
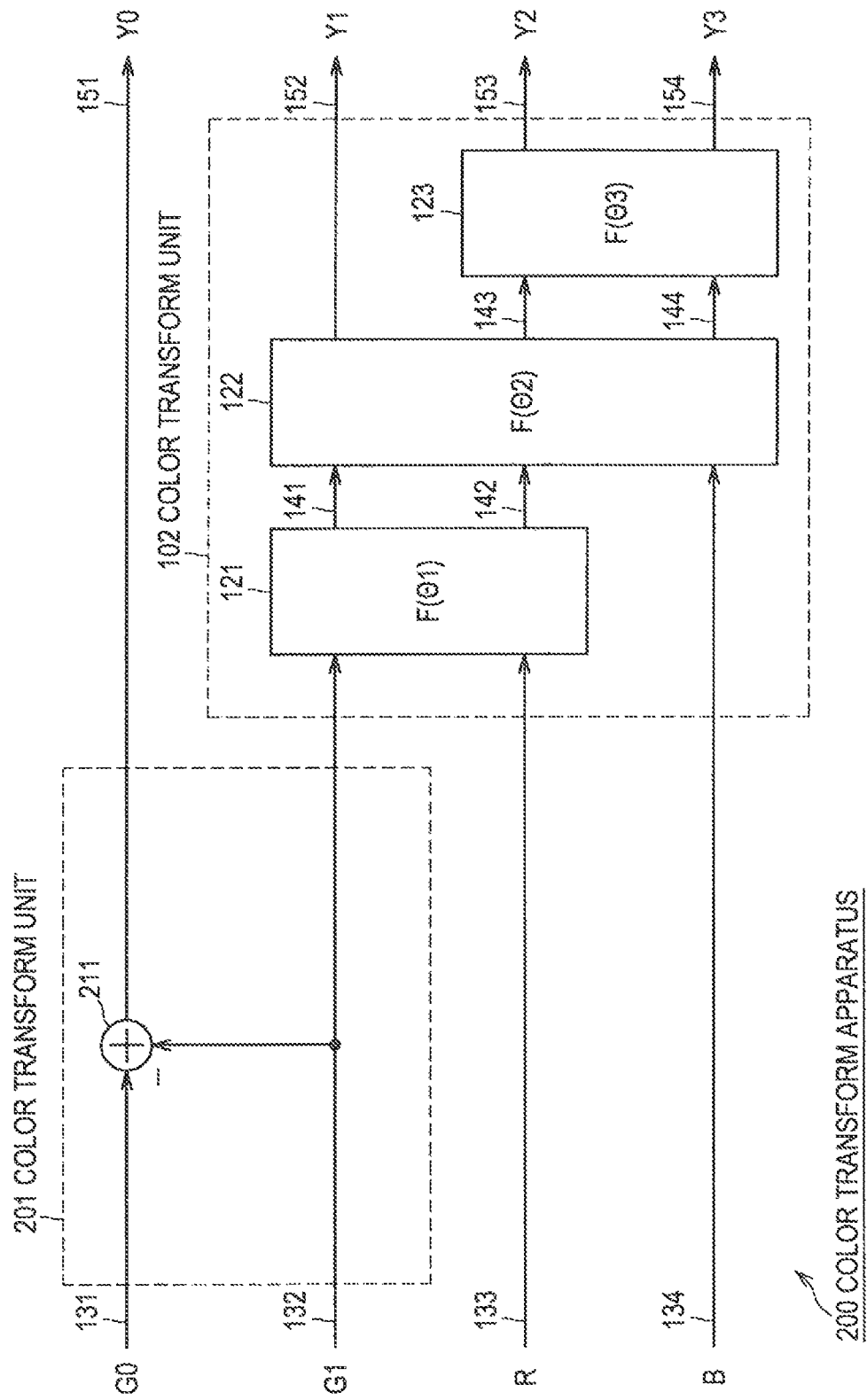
FIG. 6 is a diagram showing another example of the configuration of a color transform apparatus according to the present disclosure.

FIG. 6 is a block diagram showing yet another configuration of a color transform apparatus.

The color transform apparatus 200 shown in FIG. 6 is fundamentally the same as the color transform apparatus 100 in FIG. 4 and has the same configuration as the color transform apparatus 100 but includes a color transform unit 201 in place of the color transform unit 101.

The color transform unit 201 carries out DPCM on a combination of color components that have high correlation with one another (i.e., a color component group composed of a plurality of color components) out of the inputted color components. The color transform unit 201 includes a subtractor 211.

The subtractor 211 subtracts the input 132 (G1) from the input 131 (G0). This subtraction result is outputted to the periphery of the color transform apparatus 200 from the output 151 as one output of the color transform unit 201 (Y0).

Also, as the other output of the color transform unit 201, the input 132 (G1) is supplied to the color transform unit 102. That is, the color transform unit 102 carries out a KLT on the input 132 (G1), the input 133 (R), and the input 134 (G).

Equation (11) below shows a formula representing the color transform unit 201.

Equation (11)

$$\begin{bmatrix} Y0 \\ Y1 \end{bmatrix} = \begin{bmatrix} 1 & -1 \\ 0 & 1 \end{bmatrix} \begin{bmatrix} G0 \\ G1 \end{bmatrix} \quad (11)$$

As shown in Equation (11), with the color transform unit 201, it is possible to carry out a transform using only subtraction. Accordingly, the color transform unit 201 is capable of further reducing the load than with the Haar transform of the color transform unit 101. That is, the color transform apparatus 200 is capable of further reducing the load of the color transform process compared to when the color transform apparatus 100 is used.

However, the Haar transform carried out by the color transform unit 101 has a greater redundancy reducing effect than the color transform unit 201.

Flow of Color Transform Process

Figure 7:
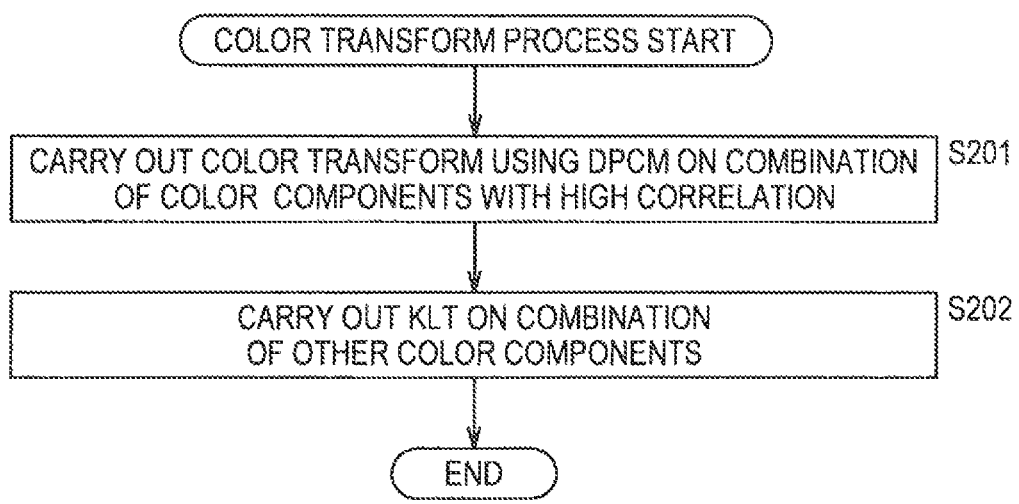
FIG. 7 is a flowchart useful in explaining another example of the flow of a color transform process.

Next, one example of the flow of the color transform process carried out by the color transform apparatus 200 in FIG. 6 will be described with reference to the flowchart, in FIG. 7. In this case also, although the color transform process is carried out in fundamentally the same way as the case described with reference to the flowchart in FIG. 5, in step S201, the color transform unit 201 of the color transform apparatus 200 carries out a color transform using DPCM on a combination of color components with high correlation in place of the processing in step S101.

In step S202, the same processing as in step S101 is carried out.

By carrying out such color transform process, the color transform apparatus 200 is capable of further reducing the load of the color transform process compared to when the color transform apparatus 100 is used.

Color Transform Apparatus 5

Note that as the color transform process on a combination of color components that have high correlation with one another, it is possible to use an S transform instead of the Haar transform and DPCM described above.

Figure 8:
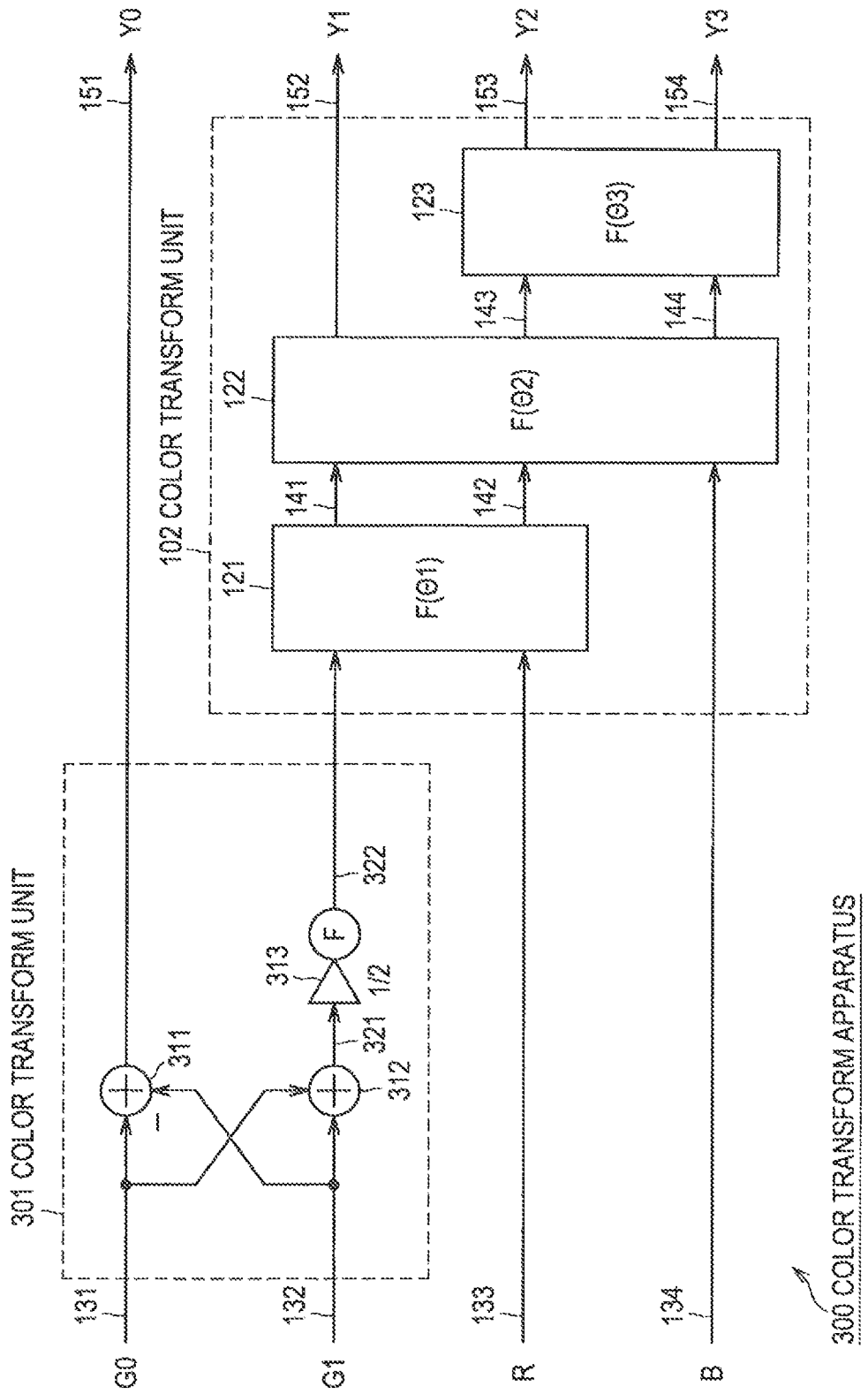
FIG. 8 is a diagram showing another example of the configuration of a color transform apparatus according to the present disclosure.

FIG. 8 is a block diagram showing yet another configuration of a color transform apparatus.

The color transform apparatus 300 shown in FIG. 8 is fundamentally the same as the color transform apparatus 100 in FIG. 4 and has the same configuration as the color transform apparatus 100 but includes a color transform unit 301 in place of the color transform unit 101.

The color transform unit 301 carries out an S transform on a combination of color components that have high correlation with one another (i.e., a color component group composed of a plurality of color components) out of the inputted color components. The color transform unit 301 includes a subtractor 311, an adder 312, and a right one-bit shift unit 313.

The subtractor 311 subtracts the input 132 (G1) from the input 131 (G0). This subtraction result is outputted to the periphery of the color transform apparatus 300 from the output 151 as one output of the color transform unit 301 (Y0).

The adder 312 adds the input 131 (G0) and the input 132 (G1) to obtain an addition result 321 (G0+G1). The right one-bit shift unit 313 divides the addition result 321 by two (i.e., shifts the result to the right by one bit (F[G0+G1]/2)) to obtain a division result 322.

The division result 322 is supplied to the color transform unit 102 as the other output of the color transform unit 301. That is, the color transform unit 102 carries out a KLT on the division result 322 (F[G0+G1']/2)), the input 133 (R), and the input 134 (G).

Equation (12) below shows a formula representing the color transform unit 301.

Equation (12)

$$\begin{bmatrix} Y0 \\ Y1 \end{bmatrix} = \begin{bmatrix} 1 & -1 \\ 1/2 & 1/2 \end{bmatrix} \begin{bmatrix} G0 \\ G1 \end{bmatrix} \quad (12)$$

As shown in Equation (12), in the color transform unit 301, it is possible to carry out a transform by merely carrying out addition, subtraction, and bit shift operations in the same way as the color transform unit 101. Accordingly, in the same way as the color transform apparatus 100, the color transform apparatus 300 is capable of reducing the load of the color transform process compared to the color transform apparatus 30.

Flow of Color Transform Process

Figure 9:
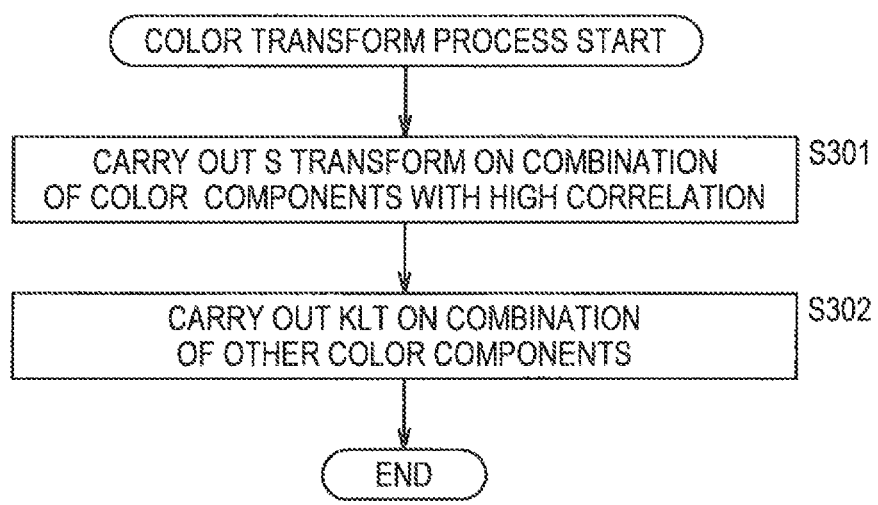
FIG. 9 is a flowchart useful in explaining yet another example of the flow of a color transform process.

Next, one example of the flow of the color transform process carried out by the color transform apparatus 300 in FIG. 8 will be described with reference to the flowchart in FIG. 9. In this case also, although the color transform process is carried out in fundamentally the same way as the case described with reference to the flowchart in FIG. 5, in step S301, the color transform unit 301 of the color transform apparatus 300 carries out an S transform on a combination of color components with high correlation in place of the processing in step S101.

In step S302, the same processing as in step S101 is carried out.

By carrying out such color transform process, in the same way as when the color transform apparatus 100 is used, the color transform apparatus 300 is capable of reducing the load of the color transform process compared to when the color transform apparatus 30 is used.

Entropy Value

Comparison results for entropy with the five color transform methods described above are shown in the table in FIG. 10. The table shown in FIG. 10 compares changes in entropy when a color transform is carried out with the five methods described above for five RAW images numbered RAW1 to RAW5.

RAW1 to RAW5 are arbitrary RAW images that differ and the values from the second row from the top onwards in the table in FIG. 10 are entropy values. The entropy values given here are defined as shown below in Equation (13).

$$H_1(S) = \Sigma pi \times \log_2(1/pi) \quad (13)$$

The entropy values are defined as the sum of the multiplication results for the data size pi of each output signal and the occurrence probability ($\log 2(1/pi)$) with which such signal occurs. The smaller this entropy value, the greater the reduction in data size, demonstrating that there is a large effect in reducing the data size.

The values on the second row from the top of the table in FIG. 10 show entropy values before a color transform on each image. The values on the third row from the top show entropy values after a color transform on the respective images using a bit shift and addition/subtraction carried out by the color transform apparatus 10 shown in FIG. 2. In addition, the values on the fourth row from the top show entropy values after a color transform on the respective images using a four-input KLT carried out by the color transform apparatus 30 shown in FIG. 3.

The values on the fifth row from the top show entropy values after a color transform on the respective images using a Haar transform and a three-input KLT carried out by the color transform apparatus 100 shown in FIG. 4. The values on the sixth row from the top show entropy values after a color transform on the respective images using a DPCM and a three-input KLT carried out by the color transform apparatus 200 shown in FIG. 6. In addition, the values on the seventh row from the top show entropy values after a color transform on the respective images using an S conversion and a three-input KLT carried out by the color transform apparatus 30 shown in FIG. 8.

In the entropy values shown in the table in FIG. 10, favorable results where the entropy values are low are obtained when a color transform is carried out by any of the color transform apparatus 100 to the color transform apparatus 300 compared to when the color transform apparatus 10 is used. Also, when a color transform is carried out by any of the color transform apparatus 100 to the color transform apparatus 300, the entropy values are substantially equal to when the color transform apparatus 30 is used.

In this way, the color transform apparatus 100 to the color transform apparatus 300 are all capable of suppressing an increase in the processing load while realizing a large effect in reducing the data size.

2. Second Embodiment

Image Encoding Apparatus 1

Color components that have been subjected to a color transform according to the color transform method described in the first embodiment may also be encoded.

Figure 11:
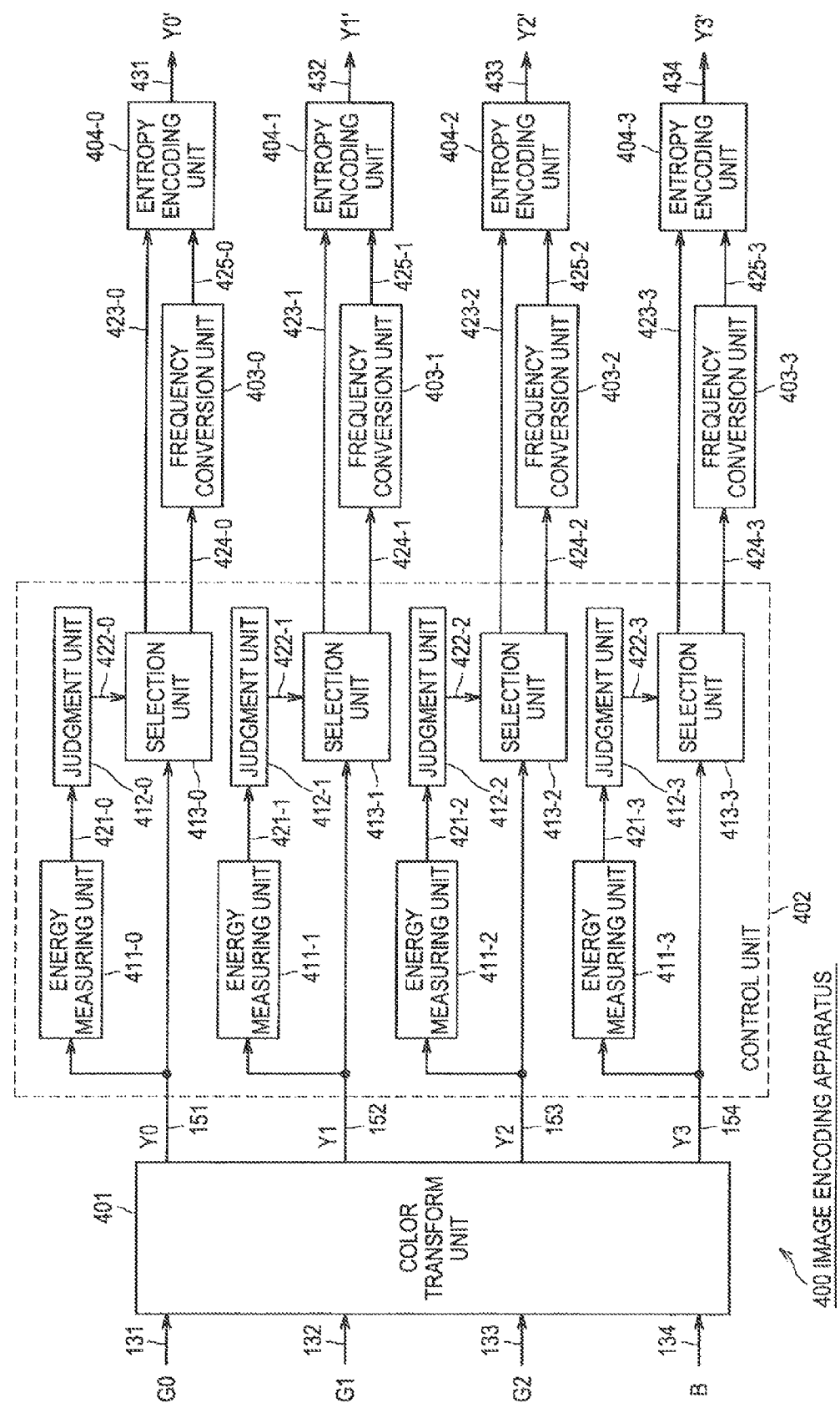
FIG. 11 is a diagram showing one example of the principal configuration of an image encoding apparatus according to the present disclosure.

FIG. 11 is a block diagram useful in explaining an example of the principal configuration of an image encoding apparatus.

An image encoding apparatus 400 shown in FIG. 11 carries out a color transform according to the method described in the first embodiment on the RAW image data (i.e., carries out RAW compression) and then also encodes the respective color components after the color transform as appropriate according to a frequency conversion.

As shown in FIG. 11, the image encoding apparatus 400 includes a color transform unit 401, a control unit 402, frequency conversion units numbered 403-0 to 403-3, and entropy encoding units numbered 404-0 to 404-3.

Note that in the following description, when there is no need to distinguish between the frequency conversion units 403-0 to 403-3, such units are simply referred to as the "frequency conversion unit 403". Similarly, when there is no need to distinguish between the entropy encoding units 404-0 to 404-3, such units are simply referred to as the "entropy encoding unit 404".

The color transform unit 401 carries out RAW compression by performing a color transformation on the respective color components (input 131 (G0), input 132 (G1), input 133 (R), and input 134 (B)) inputted into the image encoding apparatus 400 and outputs the respective color components after color transform (output 151 (Y0), output 152 (Y1), output 153 (Y2), and output 154 (Y3)).

As the color transform unit 401, any of the color transform apparatus 100, the color transform apparatus 200, and the color transform apparatus 300 described in the first embodiment is used as a processing unit. That is, the color transform unit 401 is capable of suppressing an increase in the processing load while achieving a large effect in reducing data size as described in the first embodiment.

Note that if the effects described above in the first embodiment do not need to be obtained, it is possible to use a color transform apparatus (color transform method) aside from the color transform apparatus 100 to the color transform apparatus 300 described above, such as the color transform apparatus 10 or the color transform apparatus 30, as the color transform unit 401.

The control unit 402 controls whether frequency conversion will be carried out on the respective color components after the color transform. Here, for example, even if frequency conversion is carried out on components that originally have little energy (i.e., whose absolute values are low), little effect will be obtained. Accordingly, the control unit 402 measures the energy of the respective color components and controls whether to carry out frequency conversion in accordance with the magnitude of such energy.

The frequency conversion unit 403 converts the inputted color components to frequency components according to a predetermined method such as a DCT (Discrete Cosine Transform) or a wavelet transform. The frequency conversion unit 403 supplies frequency conversion coefficients obtained by the frequency conversion to the entropy encoding unit 404.

The entropy encoding unit 404 encodes the color components supplied from the control unit 402 or the frequency conversion coefficients supplied from the frequency conversion unit 403 using a predetermined method such as variable length coding (VLC) and arithmetic coding.

The control unit 402 includes energy measuring units numbered 411-0 to 411-3, judgment units numbered 412-0 to 412-3, and selection units numbered 413-0 to 413-3.

In the following description, when there is no need to distinguish between the energy measuring units 411-0 to 411-3, such units are simply referred to as the "energy measuring unit 411". Similarly, when there is no need to distinguish between the judgment units 412-0 to 412-3, such units are simply referred to as the "judgment unit 412". In addition, when there is no need to distinguish between the selection units 413-0 to 413-3, such units are simply referred to as the "selection unit 413".

For the output, 151 (Y0), the energy measuring unit 411-0 measures for example the square (or the absolute value) of the signal value and supplies an energy measurement 421-0 to the judgment unit 412-0. The judgment unit 412-0 compares the energy measurement 421-0 with a specified threshold stored in advance and judges whether to have frequency conversion carried out on the color component in question. In accordance with such judgment result, the judgment unit 412 supplies an instruction 422-0 showing whether frequency conversion is to be carried out to the selection unit 413-0. Based on such instruction 422-0, the selection unit 413-0 selects the output destination of the output 151 (Y0) of the color transform unit 401.

For example, if the energy measurement 421-0 is equal to or above the threshold, (or is simply larger than the threshold) the judgment unit 412-0 outputs the instruction 422-0 so that frequency conversion is carried out. In accordance with such instruction 422-0, the selection unit 413-0 selects the frequency conversion unit 403-0 as the output destination of the output 151 (Y0) of the color transform unit 401. That is, in this case, the selection unit 413-0 supplies the output 151 (Y0) of the color transform unit 401 to the frequency conversion unit 403-0 as the output 424-0.

The frequency conversion unit 403-0 carries out frequency conversion on the output 424-0 of the selection unit 413-0 and supplies the frequency conversion coefficients 425-0 to the entropy encoding unit 404-0. The entropy encoding unit 404-0 carries out entropy encoding on the frequency conversion coefficients 425-0 and outputs the obtained encoded data (Y0') from the output 431.

As another example, if the energy measurement 421-0 is smaller than the threshold, (or is equal to or smaller than the threshold) the judgment unit 412-0 outputs the instruction 422-0 so as to omit the frequency conversion. In accordance with such instruction 422-0, the selection unit 413-0 selects the entropy encoding unit 404-0 as the output destination of the output 151 (Y0) of the color transform unit 401. That is, in this case, the selection unit 413-0 supplies the output 151 (Y0) of the color transform unit 401 to the entropy encoding unit 404-0 as the output 423-0.

The entropy encoding unit 404-0 carries out entropy encoding on the output 423-0 of the selection unit 413-0 and outputs the obtained encoded data (Y0') from the output 431.

The same processing is carried out for the other color components.

That is, for the output 152 (Y1), the energy measuring unit 411-1 measures the energy and the judgment unit 412-1 compares the energy measurement 421-1 with a specified threshold stored in advance and judges whether to have frequency conversion carried out on the color component in question. Based on an instruction 422-1 supplied from the judgment unit 412-1, the selection unit 413-1 selects the output destination of the output 152 (Y1) of the color transform unit 401.

For example, if the energy measurement 421-1 is equal to or above the threshold (or is simply larger than the threshold), in accordance with the instruction 422-1 from the judgment unit 412-1, the selection unit 413-1 selects the frequency conversion unit 403-1 as the output destination of the output 152 (Y1) of the color transform unit 401. The frequency conversion unit 403-1 carries out frequency conversion on the output 424-1 of the selection unit 413-1 and the entropy encoding unit 404-1 carries out entropy encoding on the frequency conversion coefficients 425-1 and outputs the obtained encoded data (Y1') from the output 432.

As another example, if the energy measurement 421-1 is smaller than the threshold, (or is equal to or smaller than the threshold), in accordance with the instruction 422-1 from the judgment unit 412-1, the selection unit 413-1 selects the entropy encoding unit 404-1 as the output destination of the output 152 (Y1) of the color transform unit 401. The entropy encoding unit 404-1 carries out entropy encoding on the output 423-1 and outputs the obtained encoded data (Y1') from the output 432.

For the output 153 (Y2), the energy measuring unit 411-2 measures the energy and the judgment unit 412-2 compares the energy measurement 421-2 with a specified threshold stored in advance and judges whether to have frequency conversion carried out on the color component in question. Based on an instruction 422-2 from the judgment unit 412-2, the selection unit 413-2 selects the output destination of the output 153 (Y2) of the color transform unit 401.

For example, if the energy measurement 421-2 is equal to or above the threshold (or is simply larger than the threshold), in accordance with the instruction 422-2 from the judgment unit 412-2, the selection unit 413-2 selects the frequency conversion unit 403-2 as the output destination of the output 153 (Y2) of the color transform unit 401. The frequency conversion unit 403-2 carries out frequency conversion on the output 424-2 of the selection unit 413-2 and the entropy encoding unit 404-2 carries out entropy encoding on the frequency conversion coefficients 425-2 and outputs the obtained encoded data (Y2') from the output 433.

As another example, if the energy measurement 421-2 is smaller than the threshold, (or is equal to or smaller than the threshold), in accordance with the instruction 422-2 from the judgment unit 412-2, the selection unit 413-2 selects the entropy encoding unit 404-2 as the output destination of the output 153 (Y2) of the color transform unit 401. The entropy encoding unit 404-2 carries out entropy encoding on the output 423-2 of the selection unit 413-2 and outputs the obtained encoded data (Y2') from the output 431.

In addition, for the output 154 (Y3), the energy measuring unit 411-3 measures the energy and the judgment unit 412-3 compares the energy measurement 421-3 with a specified threshold stored in advance and judges whether to have frequency conversion carried out on the color component in question. Based on an instruction 422-3 from the judgment unit 412-3, the selection unit 413-3 selects the output destination of the output 154 (Y3) of the color transform unit 401.

For example, if the energy measurement 421-3 is equal to or above the threshold (or is simply larger than the threshold), in accordance with the instruction 422-3 from the judgment unit 412-3, the selection unit 413-3 selects the frequency conversion unit 403-3 as the output destination of the output 154 (Y3) of the color transform unit 401. The frequency conversion unit 403-3 carries out frequency conversion on the output 424-3 of the selection unit 413-3 and the entropy encoding unit 404-3 carries out entropy encoding on the frequency conversion coefficients 425-3 and outputs the obtained encoded data (Y3') from the output 434.

As another example, if the energy measurement 421-3 is smaller than the threshold, (or is equal to or smaller than the threshold), in accordance with the instruction 422-3 from the judgment unit 412-3, the selection unit 413-3 selects the entropy encoding unit 404-3 as the output destination of the output 154 (Y3) of the color transform unit 401. The entropy encoding unit 404-3 carries out entropy encoding on the output 423-3 of the selection unit 413-3 and outputs the obtained encoded data (Y3') from the output 434.

As described above, the control unit 402 is capable of controlling whether frequency conversion is carried out on each color component. By doing so, the image encoding apparatus 400 is capable of reducing unnecessary processing (frequency conversion processing) and can reduce the processing load of the image encoding process. Also, by doing so, the image encoding apparatus 400 can reduce the processing time of the image encoding process.

Flow of Image Encoding Process

Figure 12:
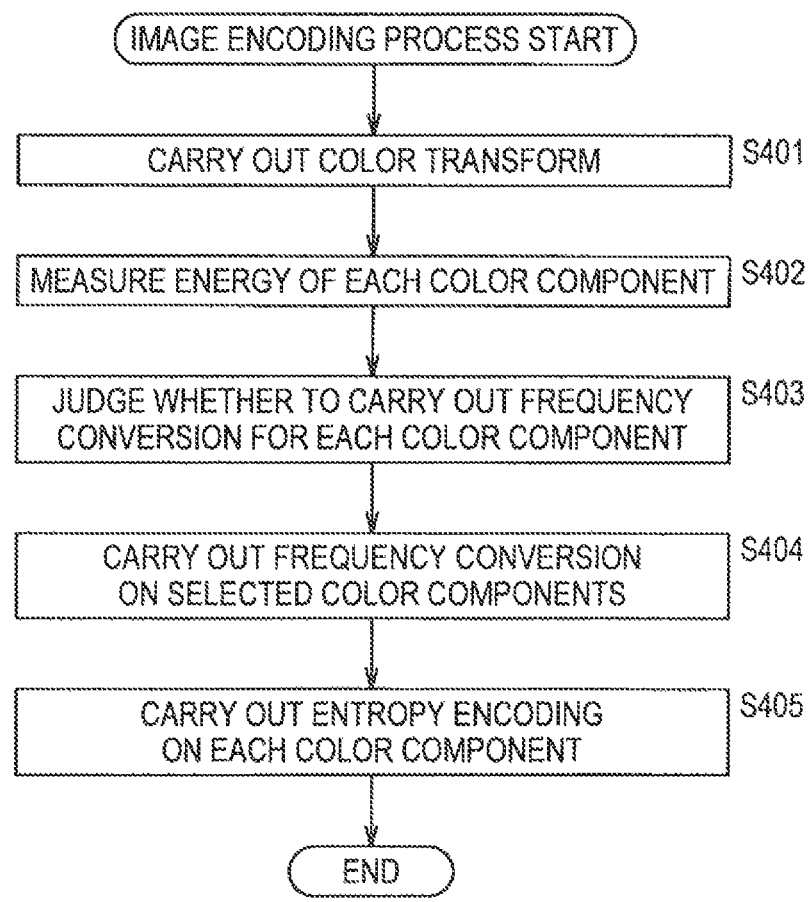
FIG. 12 is a flowchart useful in explaining one example of the flow of an image encoding process.

One example of the flow of the image encoding process carried out by the image encoding apparatus 400 shown in FIG. 11 will now be described with reference to the flowchart in FIG. 12.

Once the image encoding process starts, in step S401 the color transform unit 401 carries out a color transform process on the color components of the inputted RAW image data. As examples, for this color transform process, the same process as the color transform process described with reference to any of FIGS. 5, 7, and 9 is carried out.

When the color transform process ends, in step S402, the energy measuring unit 411 measures the energy for each color component. In step S403, the judgment unit 412 judges whether to carry out frequency conversion for each color component using the measurement produced in step S402. In accordance with the result of such judgment, the selection unit 413 selects the processing to be carried out on each color component.

In step S404, the frequency conversion unit 403 carries out frequency conversion on color components selected in step S403 as color components on which frequency conversion will be carried out.

In step S405, the entropy encoding unit 404 carries out entropy encoding on the color components selected in step S403 as color components on which frequency conversion is not carried out and also on the frequency conversion coefficients of the color components resulting from the frequency conversion in step S404.

Once entropy encoding has been carried out on the color components (or the frequency conversion coefficients thereof), the image encoding process ends.

By carrying out the processing described above, the image encoding apparatus 400 is capable of reducing the amount of redundant processing and reducing the load and processing time of the image encoding process.

Image Encoding Apparatus 2

Note that there are also cases where the combination of color components in the image data on which a color transform will be carried out is decided or where the energy distribution of the color components is decided in advance. For example, when as described above, a color transform from the four color components, G0, G1, R, and B to Y0, Y1, Y2, and Y3 is carried out, the energy of the color component Y0 generated from the components G0 and G1 that have high correlation will often be low compared to the other color components.

In such case, it is possible to omit the frequency conversion process in advance for specified color components with low energy.

Figure 13:
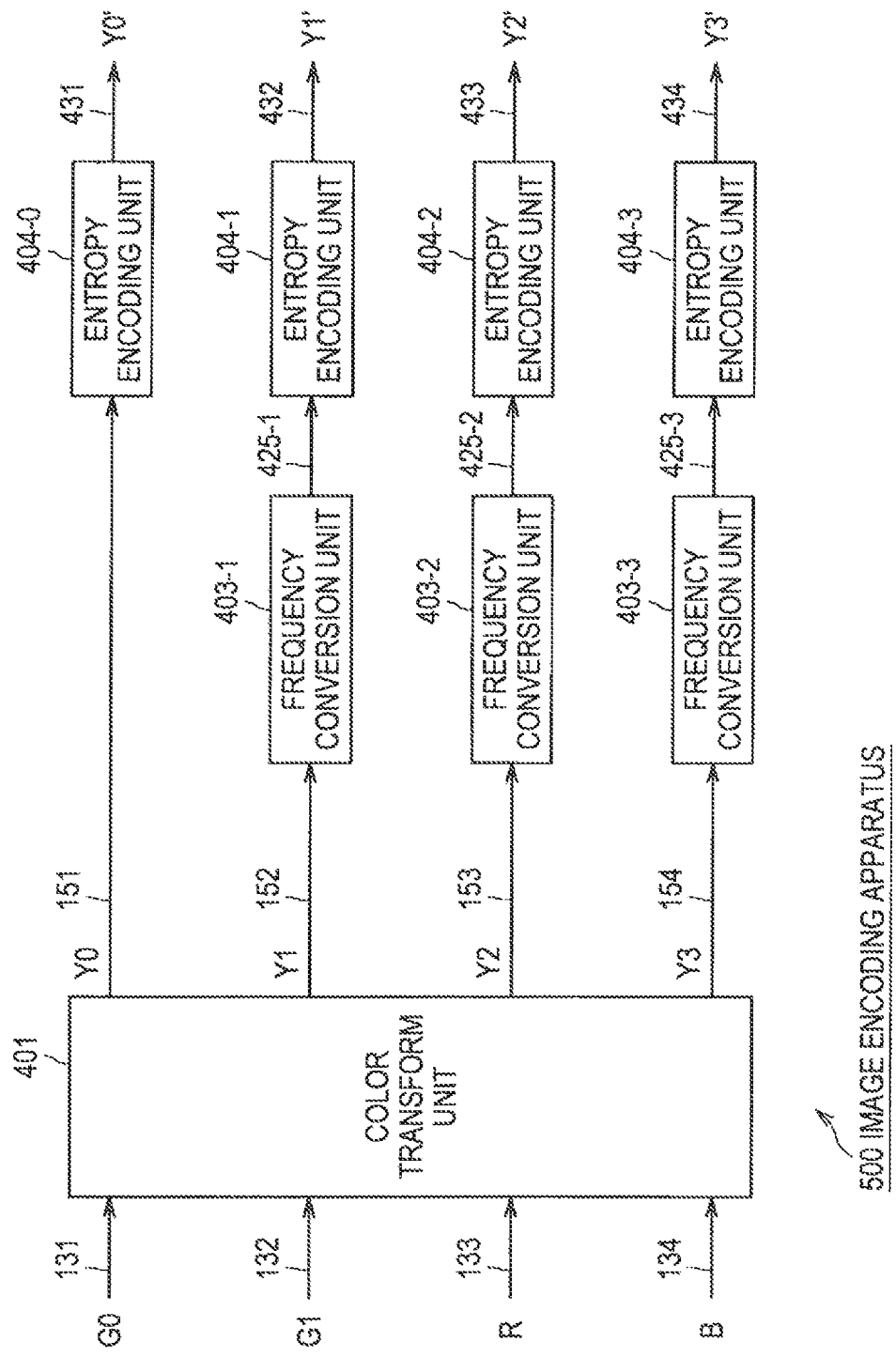
FIG. 13 is a diagram showing another example configuration of an image encoding apparatus according to the present disclosure.

FIG. 13 is a block diagram showing another example configuration of an image encoding apparatus.

The image encoding apparatus 500 shown in FIG. 13 is the same as the image encoding apparatus 400 shown in FIG. 11 except that the control unit 402 and the frequency conversion unit 403 are omitted.

That is, as shown in FIG. 13, with the image encoding apparatus 500, the output 151 (Y0) of the color transform unit 401 is supplied to the entropy encoding unit 404-0, is subjected to entropy encoding, and the obtained encoded data (Y0') is outputted from the output 431.

On the other hand, the output 152 (Y1) of the color transform unit 401 is supplied to the frequency conversion unit 403-1 and is subjected to frequency conversion. The resulting frequency conversion coefficients 425-1 are supplied to the entropy encoding unit 404-1, are subjected to entropy encoding, and the obtained encoded data (Y1') is outputted from the output 432.

In the same way, the output 153 (Y2) of the color transform unit 401 is supplied to the frequency conversion unit 403-2 and is subjected to frequency conversion. The resulting frequency conversion coefficients 425-2 are then supplied to the entropy encoding unit 404-2, are subjected to entropy encoding, and the obtained encoded data (Y2') is outputted from the output 433.

The output 154 (Y3) of the color transform unit 401 is supplied to the frequency conversion unit 403-3 and is subjected to frequency conversion. The resulting frequency conversion coefficients 425-3 are then supplied to the entropy encoding unit 404-1, are subjected to entropy encoding, and the obtained encoded data (Y3') is outputted from the output 434.

That is, with the image encoding apparatus 500, the decision as to whether frequency conversion will be carried out is made in advance for each color component. Since it is possible to omit the measurement of energy and the judgment and selection processes, the image encoding apparatus 500 is capable of further reducing the load and processing time of the image encoding process compared to when the image encoding apparatus 400 is used.

Flow of Image Encoding Process

Figure 14:
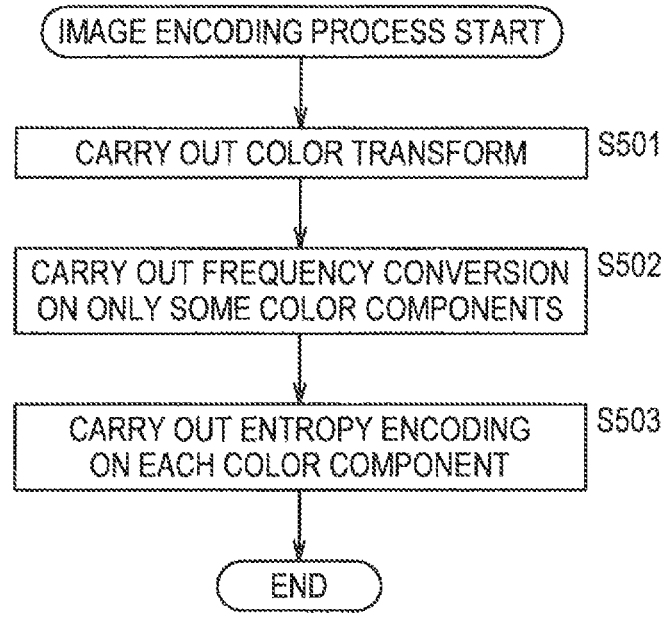
FIG. 14 is a flowchart useful in explaining another example of the flow of an image encoding process.

One example of the flow of the image encoding process according to the image encoding apparatus 500 shown in FIG. 13 will be described with reference to the flowchart in FIG. 14.

Here, once the image encoding process starts, in step S501 the color transform unit 401 carries out a color transform process on the color components of the inputted RAW image data in the same way as in step S401.

When the color transform process ends, in step S502, the frequency conversion unit 403 carries out frequency conversion on the specified color components decided in advance.

In step S503, the entropy encoding unit 404 carries out entropy encoding on the color components on which frequency conversion was not carried out in step S502 and also on the frequency conversion coefficients of the color components resulting from the frequency conversion in step S502.

Once entropy encoding has been carried out on the color components (or the frequency conversion coefficients thereof), the image encoding process ends.

By carrying out the processing described above, the image encoding apparatus 500 is capable of further reducing the load and processing time of the image encoding process.

Modifications

Note that the encoding carried out by the entropy encoding unit 404 of the image encoding apparatus 400 and the image encoding apparatus 500 may be reversible or may be irreversible. For example, the bit rate of the stream outputted by the entropy encoding unit 404 may be controlled. In such case, it is possible to control the threshold used as a judgment standard by the judgment unit 412 of the control unit 402 in accordance with the bit rate.

For example, if the bit rate of the stream outputted from the entropy encoding unit 404 is low, the judgment unit 412 may lower the threshold to make it easier for frequency conversion to be carried out (i.e., to facilitate reduction of the data size), but conversely if the bit rate of the stream outputted from the entropy encoding unit 404 is high, the judgment unit 412 may raise the threshold to make it more difficult for frequency conversion to be carried out.

The threshold may also be set independently for each color component or may be set commonly for every color component.

Figure 15:
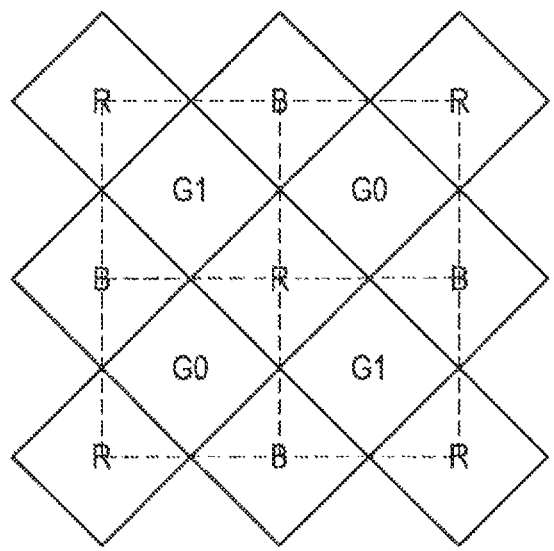
FIG. 15 is a diagram, showing another example of a Bayer pattern.

The Bayer pattern of the color components used in the first embodiment and the second embodiment described above is arbitrary and it is possible to use a different pattern to the example shown in FIG. 1. As another example, the pattern may be a double-density layer, such as that shown in FIG. 15.

In addition, the number of components in the RAW image data is arbitrary and may be five or more colors. Also, the combination of color components with high correlation depends on the pattern of color components, a combination aside from the G0 and G1 combination described above may be used as the combination of color components with high correlation, and the number of color components in such combination is also arbitrary.

For example, a color transform may be carried out on RAW image data of various types of pattern that use W (white) in addition to R, G, and B as shown in FIG. 16A to 16F. Also, as shown in FIGS. 16G, 16H, and 16J, RAW image data of various types of pattern that use Ye (yellow) may be processed.

In addition, RAW image data in which color components are arranged in the filter pattern described in Rastislav Lukac and KonstantinousN. Plataniitis, "Color Filter Arrays Design and Performance Analysis", IEEE Transactions on Consumer Electronics, Vol. 51, No. 4, November 2005 may be processed.

The color transform apparatus 100, the color transform apparatus 200, the color transform apparatus 300, the image encoding apparatus 400, and the image encoding apparatus 500 may of course include configurations aside from those described above. Also, such devices are not limited to single devices and may be configured as a system composed of a plurality of devices. For example, the apparatuses described above may be configured as a digital still camera, a video camcorder, a medical image camera, a medical endoscope, a security camera, a digital cinema-class video camera, a twin-lens stereo image camera, a multiple-lens stereo image camera, or an authoring tool or a software module thereof running on a PC.

Third Embodiment

Personal Computer

The series of processes described above can be executed by hardware or by software. In such case, as one example, it is possible to configure the apparatuses described above as a personal computer such as that shown in FIG. 17.

Figure 17:
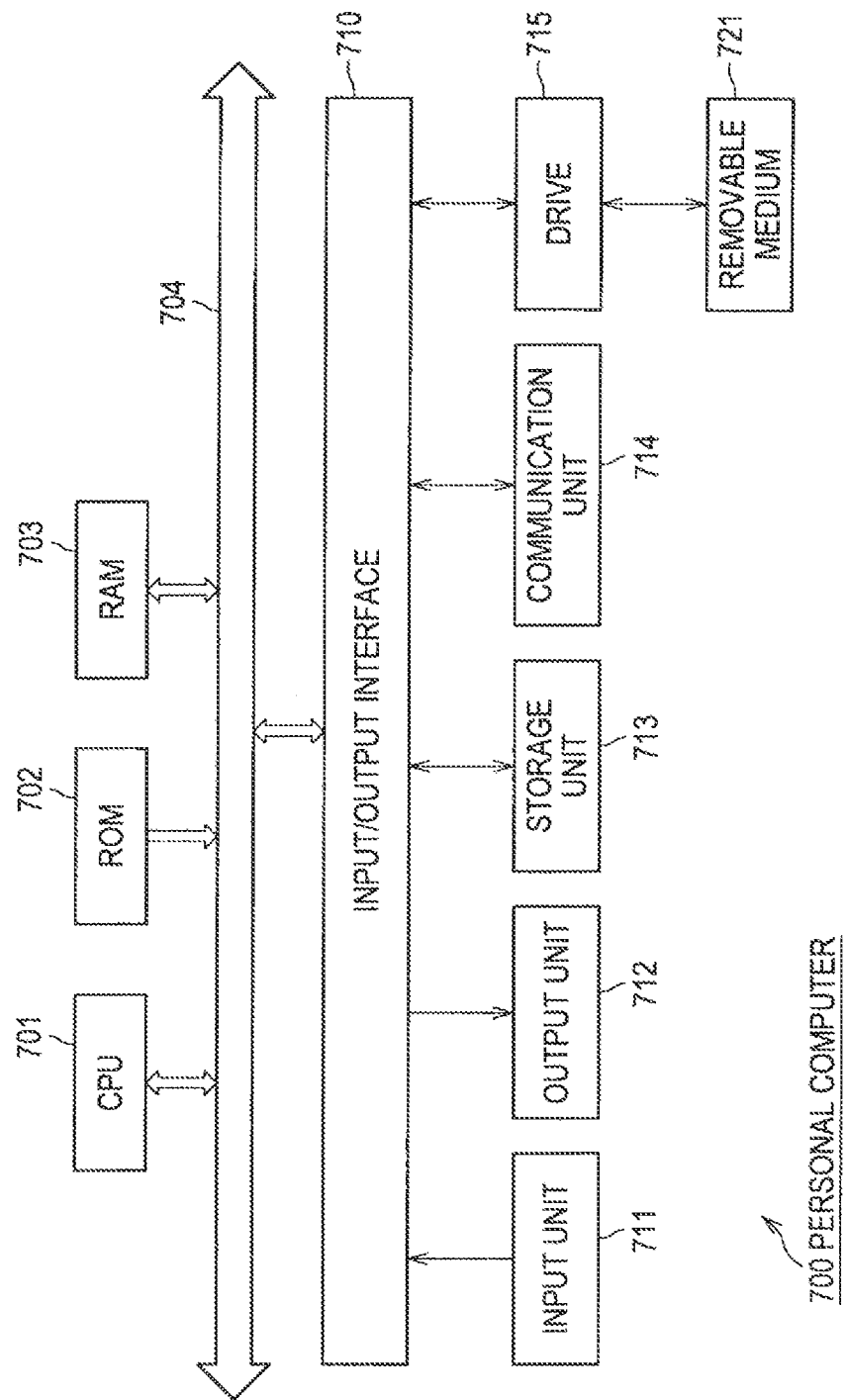
FIG. 17 is a block diagram showing an example configuration of a personal computer.

In FIG. 17, a CPU (Central Processing Unit) 701 of a personal computer 700 executes various processing in accordance with a program stored in a ROM (Read Only Memory) 702 or a program that has been loaded from a storage unit 713 into a RAM (Random Access Memory) 703. Data and the like required for the CPU 701 to execute various processes are also stored as appropriate in the RAM 703.

The CPU 701, the ROM 702, and the RAM 703 are interconnected via a bus 704. The bus 704 is also connected to the input/output interface 710.

An input unit 711 composed of a keyboard, mouse, and the like, an output unit 712 composed of speakers or the like and a display composed of a CRT (Cathode Ray Tube) display, an LCD (Liquid Crystal Display), or the like, the storage unit 713 composed of an SSD (Solid State Drive) such as a flash memory, a hard disk drive, or the like, and a communication unit 714 composed of an interface for a wired or wireless LAN (Local Area Network), a modem, or the like are connected to the input/output interface 710. The communication unit 714 carries out a communication process via a network including the Internet.

The input/output interface 710 is also connected as necessary to a drive 715 in which a removable medium 721 such as a magnetic disk, an optical disc, a magneto-optical disc, or a semiconductor memory is loaded as appropriate and a computer program read from the removable medium 721 is installed as necessary into the storage unit 713.

If the series of processes described above is executed by software, the program that constructs such software is installed from the network or from a storage medium.

As examples, this recording medium may be the removable medium 721 as shown in FIG. 17 that is separate to the apparatus main body, is used to distribute a program to the user, and is composed of a magnetic disk (including a flexible disk), an optical disc (including a CD-ROM (Compact Disc-Read Only Memory) and a DVD (Digital Versatile Disc) a magneto-optical disc (including an MD (Mini Disc)), a semiconductor memory, or the like on which a program has been recorded, or may be constructed of a device incorporated in advance in the apparatus main body, such as the ROM 702, a hard disk drive included in the storage unit 713, or the like on which a program that is to be distributed to the user has been recorded.

Note that the program executed by the computer may be a program in which processing is executed in a time series in the order described in this specification, or may be a program where processing is carried out in parallel and/or at necessary timing, such as when a call has been made.

Also, the steps in the program recorded on a recording medium in the present specification may of course include processing carried out in a time series in the order stated above. However, such steps do not actually need to be carried out in a time series and may include processes that are carried out in parallel and/or separately.

In the present specification, the expression "system" refers to an entire apparatus composed of a plurality of devices.

It is also possible for a configuration described above as a single apparatus (or processing unit) to be constructed of a plurality of apparatuses (or processing units). Conversely, it is also possible for a configuration described above as a plurality of apparatuses (or processing units) to be constructed collectively of a single apparatus (or processing unit). It should be obvious that it is also possible to add other configurations to the above-described configurations of the respective apparatuses (or processing units). In addition, so long as the configuration and/or operation of the entire system is effectively the same, part of the configuration of one apparatus (or processing unit) may be included in the configuration of another apparatus (or processing unit). That is, the embodiments of the present disclosure are not limited to the embodiments described above and may be subjected to various modifications without departing from the scope of the present disclosure.

Although preferred embodiments of the present disclosure have been described in detail with reference to the attached drawings, the present disclosure is not limited to the above examples. It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-32779 filed in the Japan Patent Office on Feb. 18, 2011, the entire content of which is hereby incorporated by reference.

What is claimed is:

1. An image processing apparatus comprising:
   a first color transform unit carrying out a first type of color transform on a first combination of color components of image data with high correlation out of a plurality of color components included in said image data; and
   a second color transform unit carrying out a second type of color transform on a second combination of color components different from the first combination of color components subjected to the color transform by the first color transform unit out of the plurality of color components included in said image data,
   wherein the second type of color transform differs from the first type of color transform and includes rotational transforms.

2. An image processing apparatus according to claim 1, wherein the second color transform unit carries out a Karhunen-Loeve transform.

3. An image processing apparatus according to claim 2, wherein the first color transform unit carries out a color transform using DPCM (Differential Pulse Code Modulation).

4. An image processing apparatus according to claim 2, wherein the first color transform unit carries out an S transform.

5. An image processing apparatus according to claim 1, wherein the first color transform unit carries out a Haar transform.

6. An image processing apparatus according to claim 1, further comprising a frequency conversion unit carrying out frequency conversion on at least some of the color components color transformed by the first color transform unit and at least some of the color components color transformed by the second color transform unit.

7. An image processing apparatus according to claim 6, further comprising a control unit controlling whether to subject the respective color components transformed by the first color transform unit and the second color transform unit to frequency conversion, wherein the frequency conversion unit carries out frequency conversion on those color components judged by the control unit to be subjected to frequency conversion.

8. An image processing apparatus according to claim 7, wherein the control unit includes:
a measuring unit measuring energy of each color component transformed by the first color transform unit and by the second color transform unit;
a judging unit comparing the measured energy of each color component with a specified threshold and judging whether to subject each color component to frequency conversion in accordance with a comparison result; and
a selection unit selecting for further processing color components subjected to frequency conversion or color components not subjected to frequency conversion in accordance with a judgment result of the judging unit.

9. An image processing apparatus according to claim 6, further comprising an encoding unit encoding (i) frequency conversion coefficients of color components obtained by the frequency conversion unit after the color transforms by the first color transform unit and the second color transform unit, and/or (ii) color components after the color transforms by the first color transform unit and the second color transform unit but not frequency converted.

10. An image processing apparatus according to claim 6, wherein the frequency conversion unit carries out a DCT (Discrete Cosine Transform) on the color components.

11. An image processing apparatus according to claim 6, wherein the frequency conversion unit subjects the color components to a wavelet transformation.

12. An image processing apparatus according to claim 1, wherein the imaged data is information on an image in which the color components are arranged in a Bayer pattern.

13. An image processing method comprising:
carrying out a first type of color transform on a first combination of color components of image data with high correlation out of a plurality of color components included in said image data; and
carrying out a second type of color transform on a second combination of color components included in said image data different from the first combination of color components subjected to the first type of color transform;
wherein the second type of color transform differs from the first type of color transform and includes rotational transforms.

14. The method of claim 13, further comprising frequency converting some or all of the color components after the first and second type of color transform.

15. The method of claim 14, further comprising encoding (i) frequency conversion coefficients of color components obtained by the frequency conversion after the first and second type of color transform, and/or (ii) color components after the first and second type of color transform that are not frequency converted.

* * * * *